C. E. NEEDHAM.
SHAFT COUPLING AND BEARING FOR GRINDING MILLS.
APPLICATION FILED OCT. 17, 1916.
1,262,379.
Patented Apr. 9, 1918.
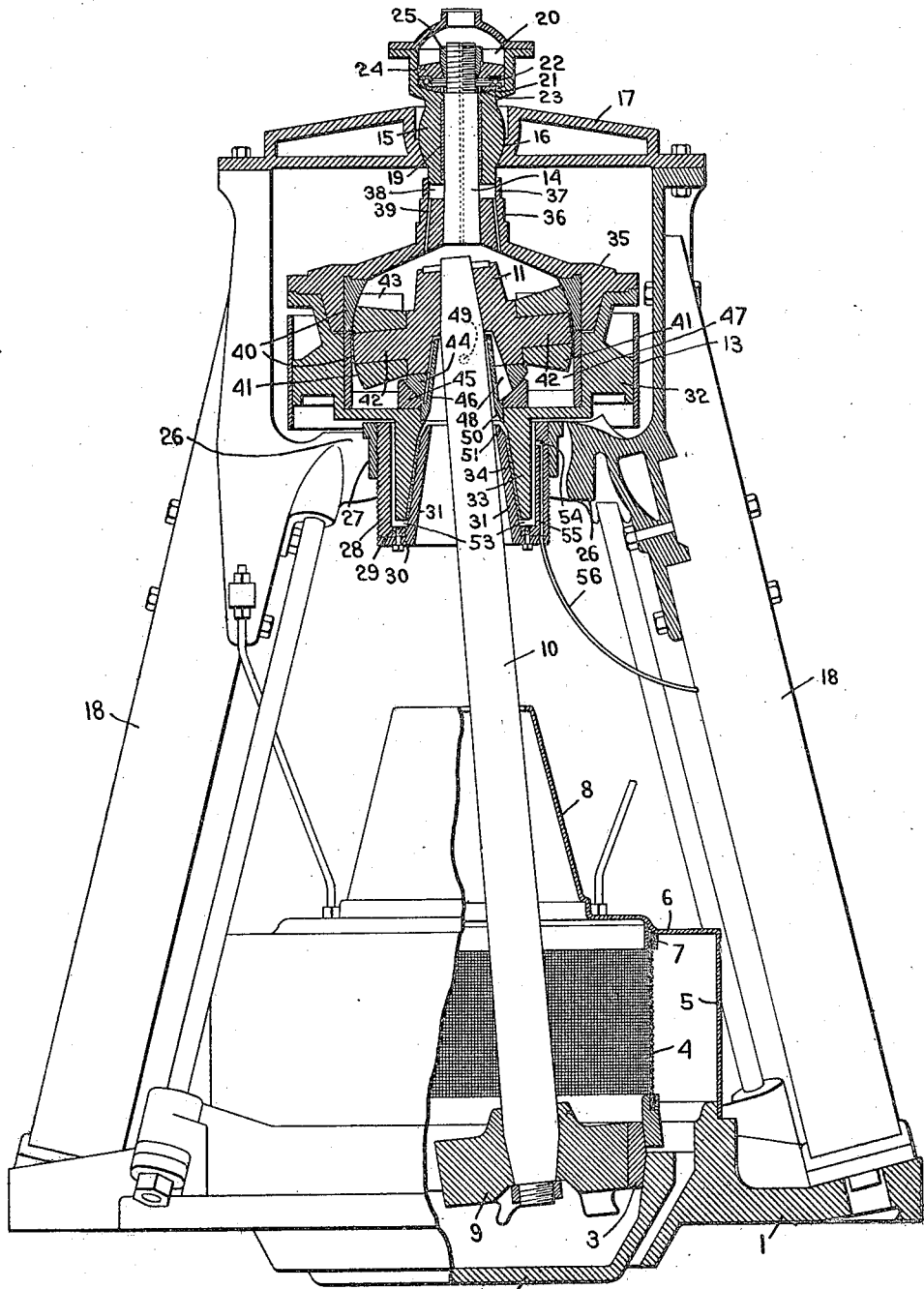
Inventor.
Charles E. Needham
by Heard Smith & Tennant.
Attys.

UNITED STATES PATENT OFFICE.

CHARLES E. NEEDHAM, OF ALLENTOWN, PENNSYLVANIA, ASSIGNOR TO BRADLEY PULVERIZER COMPANY, OF BOSTON, MASSACHUSETTS, A CORPORATION OF MAINE.

SHAFT COUPLING AND BEARING FOR GRINDING-MILLS.

1,262,379.  Specification of Letters Patent.  Patented Apr. 9, 1918.

Application filed October 17, 1916. Serial No. 126,214.

*To all whom it may concern:*

Be it known that I, CHARLES E. NEEDHAM, a citizen of the United States, and resident of Allentown, county of Lehigh, State of Pennsylvania, have invented an Improvement in Shaft Couplings and Bearings for Grinding-Mills, of which the following description, in connection with the accompanying drawing, is a specification, like characters on the drawing representing like parts.

This invention relates to grinding or pulverizing mills in which the material is reduced by a suspended revoluble roll, having a gyratory movement in relation to its vertical axis of suspension, and coöperating with an annular die.

The present invention relates to and comprises certain improvements in the coupling and bearing mechanisms which support the revoluble roll shaft.

More particularly the invention relates to improvements in the mechanisms shown and described in my prior Patent No. 1,095,986, granted May 5, 1914, in which the novel structure disclosed includes mechanism devised to insure constant lubrication of the coupling with means for preventing the escape of lubricant therefrom into the material being pulverized.

In the structure disclosed in that patent an overhead bearing supports a vertical shaft which carries a pulley having a hub having a central chamber adapted to contain a body of lubricant, means being provided in said chamber for supporting an oscillatory cross-head supporting the shaft carrying the grinding roll. The cross head is provided with laterally extending trunnions which during the operation of the machine dip into the oil in said chamber, thereby maintaining the same in a constant state of lubrication. Oil is supplied to the coupling member through the upper supporting bearing and constantly works down through the journal of the supporting shaft into the chamber containing the coupling. In keeping the upper bearing properly lubricated a surplus of oil thus flows into the coupling chamber and when it overflows centrifugal action causes it to flow down the wall of the central retaining cone and eventually to drop into the material being pulverized.

In the structure shown in that patent the lower portion of the hub of the pulley is provided with a tubular extension which is journaled in the bearing carried in the supporting frame. This lower bearing is independent of the coupling member and requires separate lubrication and any excess of oil supplied thereto is likely to drop into the materials being ground.

While the amount of oil thus discharged from the lubricant chamber and from the lower bearing is very small it is objectionable particularly in some classes of material in which the presence of even a small quantity of oil in the pulverized material is detrimental to the product. It is desirable therefore that means may be provided which will absolutely prevent any oil from reaching the material being pulverized.

One of the objects of the invention is to provide means which will prevent the escape of any of the lubricating oil into the product either from the lubricant chamber of the pulley or from the lower bearing aforesaid.

I have discovered that the oil which passes through the overhead bearing for the shaft which supports the driving pulley will replenish the oil in the lubricant chamber and that the excess of oil escaping therefrom is ample to lubricate the lower journal bearing.

A further object of the invention therefore is to provide means for utilizing the excess of oil supplied through the overhead bearing to the lubricant chamber for the purpose of lubricating the lower bearing of the driving pulley.

A further feature of the invention is to provide a construction in which oil supplied to the overhead bearing will serve both to replenish the body of oil in the chamber sufficiently to maintain the desired degree of submergence of the parts of the coupling member and wherein the oil which overflows from the lubricant chamber will be used again to lubricate the lower bearing for the pulley, means finally being provided to remove any excess of oil which may be supplied to the lower bearing and thereby to prevent any of the lubricant from reaching the material in the pulverizing chamber of the mill.

The drawing illustrates a grinding mill embodying my invention, the driving pulley, its supporting mechanism and other portions of the mill being shown in vertical section.

The mill illustrated in the drawing is of the usual "Griffin type" comprising a base or body 1 having a pan 2 furnished with an annular die 3 above which is located an annular screen 4 and a surrounding annular casing 5. The casing is provided with a substantially horizontal portion 6 having a downwardly extending flange 7 to which the upper end of the screen 4 is secured. Said casing also has a conical upwardly extending central portion 8 truncated sufficiently to permit the gyratory movement of the shaft which carries the crushing roll. The crushing roll 9 is rigidly secured to a suspended shaft 10 having a conical end which is fixed in a corresponding aperture in a cross head 11 supported by and adapted to oscillate vertically in a pulley 13 which is carried by a supporting shaft 14 which is rotatably mounted within a bearing box 15 having a spherical surface 16 seated in a corresponding socket in the cross head 17 which is carried by frame members 18 which are secured at their lower ends to the base 1.

The bearing box 15 has a vertical bore for the shaft 14 and is provided with a bushing 19. The upper portion of the bearing box is enlarged to form a chamber 20 for the overhead bearing members. The lower wall of this chamber preferably is of spherical curvature and has seated in it a bearing ring 21 for antifriction bearing members 22. The central portion of the bearing ring 21 is provided with oil ducts 23 leading from said chamber to the bearing between the bushing 19 and the shaft 14. A coöperating bearing member 24 is adjustably secured to the shaft 14 by a nut 25 screw threaded upon said shaft thus providing for the vertical adjustment of the shaft 14.

The overhead bearing thus described is substantially the same as that disclosed in the patent to Griffin No. 1,020,092, and of course no claim is made to this construction *per se*.

In grinding mill constructions heretofore devised the weight of the grinding roll and of the pulley and its inclosed coupling mechanism has either been carried by an overhead bearing such as that just described or by a bearing supporting the pulley from beneath.

In the present construction in which the pulley and coupling is supported from an overhead bearing, I have provided a novel form of lower journal bearing to steady the coupling member, means being provided for directing all of the excess of oil which flows through the upper bearing and coupling member into said lower bearing so that the latter is maintained in a suitable state of lubrication and the excess therefrom discharged to some convenient point outside of the mill.

In the preferred embodiment of the invention illustrated herein the frame 18 has supporting brackets 26 having a ring 27 integral therewith or secured thereto.

The inner surface of said ring is screw threaded to engage the screw threaded periphery of a sleeve 28 having an inwardly extending flange 29 which is bolted to or may be made integral with a flange 30 upon the conical hub 31 which forms a lower supporting bearing for the pulley 13.

The pulley 13 desirably is substantially similar to that disclosed in my prior Patent No. 1,095,986 and comprises a hub formed in two sections, the lower or socket section 32 being provided with a tubular extension 33 having a tapered wall adapted to engage a bushing 34 carried by the conical hub 31. The upper or cap section 35 of the pulley hub is provided with a boss 36 which is fixedly secured to the lower portion of the shaft 14, said boss desirably being provided with an upwardly extending flange 37 inclosing the lower end of a bearing box 19 and forming an oil chamber 38 adapted to receive any oil which may pass through the bearing box 19.

Ducts 39 passing through the boss 36 permit the oil to flow from the chamber 38 into the hollow interior or chamber of the pulley. Within the socket member 32 are diametrically disposed upright concaved gibs or seats 40 which usually are made in two parts for convenience, as shown, and which coöperate with the curved convex end faces of segments 41 which are mounted upon trunnions 42 extending laterally from the cross head 11, the segments 41 being guided in ways between blocks 43 as is usual in such constructions. The lower end of the cross head is provided with a wear ring 44 having a spherical surface engaging a coöperating ring 45 seated upon the interior of the lower horizontal wall of the socket portion 32 of the pulley. The under face of the cross head is provided with a preferably conical aperture into which extends a truncated conical sleeve 46 which is secured to the lower section 32 of the hub of the pulley and within the bearing ring 45 by an oil tight joint. The conical sleeve 46 forms the inner wall of the chamber 47 adapted to receive a body of lubricant sufficient to partially immerse the segments upon the cross head.

As will be seen by reference to the drawing there is an inner elongated space or chamber 48 between the exterior of the conical sleeve 46 and the conoidal wall of the recess in the cross head, and this chamber or space is brought into direct communication with the chamber 47 by one or more holes 49 in the wall of the cross head so that when the chamber 47 is filled with oil and the mill is at rest the oil will flow through the aperture 49 into the inner chamber 48 surrounding the sleeve 46 until it reaches a uniform level within and without the spherical bearing members 44, 45.

When the mill is set in operation the motion of the inclosed cross head and its adjuncts will agitate the oil and all portions of the mechanism when the pulley will be maintained thoroughly lubricated. The centrifugal force generated by the rotation of the coupling will cause the oil immediately surrounding the conical member 46 to flow outwardly through the apertures 49 substantially down to the level of the latter.

The oil remaining in the interior chamber 48 will however be sufficient to maintain the bearing surface of the members 44, 45 lubricated and it is found that a small amount of this oil will also be carried by splashing and by centrifugal force upwardly along the walls of the conical aperture in the cross head and the outer wall of the conical sleeve 47 until it passes over the end of the latter and runs down the inner face of said sleeve. The lower end of the sleeve 46 is provided with an annular beveled portion 50 which extends beyond the upper end of the conical hub 31 and the latter is provided with a beveled portion 51 corresponding to the bevel 50 thus providing an annular oil guideway leading to the bearing between the bushing 34 and the tubular downward extension 33 of the lower portion 32 of the pulley hub.

The tubular extension 33 of the pulley hub and the conical hub 31 are so constructed as to leave a chamber 53 adapted to receive the oil which passes through the bearing between said extension and hub and the sleeve 28 may be constructed of sufficient size to cause this chamber to extend upwardly along the outer wall of the tubular extension. The chamber 53 therefore is adapted to retain a considerable amount of oil which may pass through said lower bearing. Any suitable means may be provided for disposing of any excess of oil. As illustrated herein a port 54 communicates with a duct 55 which leads to an outlet pipe 56 which may discharge in any suitable receptacle.

By the construction illustrated and described herein means are provided for repeatedly utilizing the oil fed into the upper bearing and finally disposing of the oil in such a manner that it cannot by any possibility enter into the material being pulverized. Furthermore, means are provided whereby the weight of the roll, the shaft coupling and the pulley may be divided between the upper and lower bearings if desired.

In erecting the mill the lower bearing is suitably lubricated and when the coupling members are assembled a sufficient amount of oil is introduced into the chamber 47 to fill the same up to and preferably slightly above the apertures 49 in the walls of the cross head 11 and finally the chamber 20 of the upper bearing is filled with a lubricant.

During the operation of the mill the oil in the chamber 20 will gradually pass through the antifriction bearing and passing through the ducts 23 of the wear plate 21 will lubricate the bearing between the bushing 19 and the shaft 14. The oil passing through this bearing will be received in the chamber 38 at the upper end of the boss 36 of the upper section of the pulley hub from which chamber it will flow through the ducts 39 into the chamber 47 in the hub of the pulley 13, thereby replenishing the oil in said chamber.

The small amount of oil which passes from said chamber or rather from the interior chamber 48 which communicates therewith, over the conical wall 46 trickles down the inner face of said wall and along the inclined portion 50 into the bearing between the bushing 34 and the tubular extension 33 of the lower section of the pulley, thus maintaining the lower bearing well lubricated. The excess of oil passing through the lower bearing accumulates in the chamber 53 from which any excess may escape through the port 54, duct 55 and pipe 56.

By reason of this construction it is found that the consumption of oil is very materially reduced so that where approximately a gallon and a half a day was formerly used in mills of this type, only about a pint is consumed in the operation of the mill disclosed herein.

By providing both upper and lower supporting bearings for the pulley, its inclosed shaft coupling, and the revoluble crushing roll, a more rigid and steady mechanism is provided than in mills heretofore constructed.

It will be understood that the embodiment of the invention disclosed herein is illustrative in character and is not restrictive and that other mechanisms may be provided within the meaning and scope of the following claims.

Having thus described my invention what I claim as new and desire to secure by Letters Patent is:

1. A supporting journal for a shaft coupling comprising a frame, an overhead thrust bearing on said frame, a supporting shaft carried by said thrust bearing, a suspended shaft, a universal coupling connecting said suspended shaft to said supporting shaft having a tubular downward extension and a supplemental bearing located beneath and engaging said downward extension.

2. A supporting journal for a shaft coupling comprising a frame, an overhead thrust bearing on said frame, a supporting shaft carried by said thrust bearing, a driving pulley fixed to said shaft having a tubular downward extension, a suspended shaft having a cross head mounted to rock in said pulley and a supplemental bearing located beneath and inclosing the tubular downward extension of said pulley.

3. A supporting journal for a shaft coupling comprising a frame, an overhead thrust bearing on said frame, a supporting shaft carried by said thrust bearing, a driving pulley having a hollow hub fixed to said supporting shaft and provided with a tubular downward extension and an upwardly extending conical member forming one wall of a lubricant chamber within said pulley, a supplemental bearing located beneath said tubular extension, a suspended shaft having a cross head mounted to rock in bearings within said pulley, means for supplying oil to said lubricant chamber and means for directing the oil passing over the top of said conical member into said supplemental bearing.

4. A supporting journal for a shaft coupling comprising a frame, an overhead thrust bearing on said frame, a supporting shaft carried by said thrust bearing, a driving pulley having a hollow hub fixed to said supporting shaft and provided with a tubular downward extension and an upwardly extending conical member forming the inner wall of a lubricant chamber within said pulley, a supplemental bearing located beneath and inclosing said tubular extension, a suspended shaft having a cross head mounted to rock in bearings in said pulley, means for supplying oil to said lubricant chamber, means for directing the oil passing over the top of said conical member into said supplemental bearing, a chamber beneath said supplemental bearing to receive the oil passing through said bearing and means for removing the surplus of oil from said chamber.

5. A supporting journal for a shaft coupling comprising a frame, an overhead thrust bearing on said frame, a supporting shaft carried by said thrust bearing, a hollow driving pulley secured to said shaft provided with a central opening extending through its under face, said opening being surrounded by a wall to form a lubricant chamber within said pulley, means for supplying oil to said overhead thrust bearing, means for causing oil passing through said overhead bearing to flow into said lubricant chamber, a suspended shaft having a cross head mounted to oscillate in a vertical plane within said hollow pulley and having members adapted to be immersed in the oil in said chamber, a tubular downward extension on said pulley, a supplemental bearing supported by said frame inclosing said downward extension and means for directing the oil passing over the inner wall of said lubricant chamber into said supplemental bearing whereby oil supplied to the overhead thrust bearing will replenish the oil delivered from the lubricant chamber and the oil passing from the lubricant chamber will lubricate the supplemental bearings.

6. A supporting journal for a shaft coupling comprising a frame, an overhead thrust bearing on said frame, a supporting shaft carried by said thrust bearing, a hollow driving pulley secured to said shaft provided with a central opening through its lower face, a conical wall surrounding said opening and forming the inner wall of a lubricant chamber within said pulley, means for supplying oil to said overhead thrust bearing, means for causing oil passing through said overhead thrust bearing to flow into said lubricant chamber, a suspended shaft having a cross head mounted to oscillate in a vertical plane within said hollow pulley and having guiding members adapted to be immersed in the oil in said chamber, a tubular downward extension on said pulley having an outwardly flaring conical inner wall, a supplemental bearing carried by said frame having a conical hub extending into said tubular bearing, means for supporting said hub providing a lubricant chamber beneath said bearing and means for removing the excess of oil from said chamber.

7. A supporting journal for a shaft coupling comprising a frame provided with an overhead transverse member having a spheroidal socket, a bearing box having a spheroidal portion seated in said socket and having an upward extension providing an oil chamber, a thrust bearing in said oil chamber, a supporting shaft carried by said thrust bearing, a pulley fixed to said shaft having a hollow hub provided with a central opening, a conical member surrounding said opening and forming the inner wall of a lubricant chamber within said pulley, means for causing oil passing through said overhead bearing to flow into said lubricant chamber, a suspended shaft having a cross head mounted for oscillation in a vertical plane within said pulley and having a conical recess to receive the inner conical wall of said lubricant chamber, a tubular downward extension from said pulley having a conoidal inner surface, a supplemental bearing carried by said frame having a hub engaging said conical surface and providing a lower bearing for said pulley, means for adjustably supporting said hub, and means for guiding oil passing over the inner wall of said lubricant chamber into said supplemental bearing.

8. A supplemental journal for a shaft coupling comprising a frame, an overhead thrust bearing on said frame having an oil reservoir, a supporting shaft carried by said thrust bearing, a hollow driving pulley fixed to said shaft and having a tubular downward extension, a supplemental lower bearing carried by said frame inclosing said tubular extension, means forming a lubricant chamber in said hollow pulley, a suspended shaft having a cross head mounted for oscillation in said pulley and having guiding members adapted to be immersed in said lubricant, means for causing oil supplied to the overhead thrust bearing to replenish the oil in the lubricant chamber in said pulley and means for causing the oil passing from said lubricant chamber to maintain the supplemental bearing in the state of lubrication.

9. A supplemental journal for a shaft coupling comprising a frame, an overhead thrust bearing on said frame having an oil reservoir, a supporting shaft carried by said thrust bearing, a hollow driving pulley fixed to said shaft and having a tubular downward extension, a supplemental lower bearing carried by said frame inclosing said tubular extension, means forming a lubricant chamber in said hollow pulley, a suspended shaft having a cross head mounted for oscillation in said pulley and having guiding members adapted to be immersed in said lubricant, means for causing oil supplied to the overhead thrust bearing to replenish the oil in the lubricant chamber in said pulley, means for causing the oil passing from said lubricant chamber to maintain the supplemental bearing in the state of lubrication, and means for removing an excess of oil from the lower supplemental bearing.

In testimony whereof I have signed my name to this specification.

CHARLES E. NEEDHAM.

Copies of this patent may be obtained for five cents each, by addressing the "Commissioner of Patents, Washington, D. C."